United States Patent
Laschkewitsch et al.

(10) Patent No.: US 7,231,461 B2
(45) Date of Patent: Jun. 12, 2007

(54) SYNCHRONIZATION OF GROUP STATE DATA WHEN REJOINING A MEMBER TO A PRIMARY-BACKUP GROUP IN A CLUSTERED COMPUTER SYSTEM

(75) Inventors: Clinton Gene Laschkewitsch, Stewartville, MN (US); Robert Miller, Rochester, MN (US); Vicki Lynn Morey, Pine Island, MN (US); Laurie Ann Williams, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 09/952,392

(22) Filed: Sep. 14, 2001

(65) Prior Publication Data

US 2003/0056013 A1 Mar. 20, 2003

(51) Int. Cl.
G06F 15/16 (2006.01)

(52) U.S. Cl. .................. 709/248; 709/221; 709/236

(58) Field of Classification Search ................ 709/236, 709/248
See application file for complete search history.

(56) References Cited

U.S. PATENT DOCUMENTS

| | | |
|---|---|---|
| 4,709,365 A | 11/1987 | Beale et al. |
| 5,146,590 A | 9/1992 | Lorie et al. |
| 5,179,699 A | 1/1993 | Iyer et al. |
| 5,502,818 A | 3/1996 | Lamberg |
| 5,528,605 A | 6/1996 | Ywoskus et al. |
| 5,563,878 A | 10/1996 | Blakeley et al. |

(Continued)

FOREIGN PATENT DOCUMENTS

JP 05-204811 A 8/1993

(Continued)

OTHER PUBLICATIONS

Arindam Banerji et al., "High-Performance Distributed Shared Memory Substrate for Workstation Clusters," in Proc. of the Second IEEE Int'l Symposium on High Performance Distributed Computing, Jan. 1993.

(Continued)

*Primary Examiner*—Ario Etienne
*Assistant Examiner*—Avi Gold
(74) *Attorney, Agent, or Firm*—Wood, Herron & Evans, LLP

(57) ABSTRACT

An apparatus, program product and method to synchronize group state data in a primary-backup group in connection with the rejoining of a member to the primary-backup group in a clustered computer system. Each member in the group includes a copy of replicated group state data for the primary-backup group. In connection with rejoining the member, it is determined whether the rejoining member is the primary member for the primary-backup group. Then, a selection is made between member and group overwrite operations based upon such determination. The member overwrite operation includes overwriting the copy of the replicated group state data for the rejoining member with data from the copy of the replicated group state data for an existing member in the primary-backup group. The group overwrite operation includes overwriting the copy of the replicated group state data for the existing member in the primary-backup group with data from the copy of the replicated group state data for the rejoining member.

25 Claims, 3 Drawing Sheets

U.S. PATENT DOCUMENTS

| | | | |
|---|---|---|---|
| 5,640,554 A | 6/1997 | Take | |
| 5,704,032 A | 12/1997 | Badovinatz et al. | |
| 5,729,687 A | 3/1998 | Rothrock et al. | |
| 5,787,249 A | 7/1998 | Badovinatz et al. | |
| 5,805,786 A | 9/1998 | Badovinatz et al. | |
| 5,883,939 A | 3/1999 | Friedman et al. | |
| 5,926,619 A | 7/1999 | Badovinatz et al. | |
| 5,973,724 A | 10/1999 | Riddle | |
| 6,006,259 A | 12/1999 | Adelman et al. | |
| 6,014,669 A * | 1/2000 | Slaughter et al. | 707/10 |
| 6,065,062 A * | 5/2000 | Periasamy et al. | 709/242 |
| 6,078,957 A | 6/2000 | Adelman et al. | |
| 6,108,699 A | 8/2000 | Moiin | |
| 6,115,749 A | 9/2000 | Golestani et al. | |
| 6,115,830 A * | 9/2000 | Zabarsky et al. | 714/15 |
| 6,138,251 A | 10/2000 | Murphy et al. | |
| 6,185,666 B1 | 2/2001 | Murray et al. | |
| 6,192,411 B1 | 2/2001 | Chan et al. | |
| 6,216,150 B1 | 4/2001 | Badovinatz et al. | |
| 6,292,905 B1 * | 9/2001 | Wallach et al. | 714/4 |
| 6,298,041 B1 | 10/2001 | Packer | |
| 6,317,867 B1 | 11/2001 | Elnozahy | |
| 6,338,092 B1 | 1/2002 | Chao et al. | |
| 6,343,320 B1 | 1/2002 | Faichild et al. | |
| 6,363,495 B1 | 3/2002 | MacKenzie et al. | |
| 6,367,029 B1 * | 4/2002 | Mayhead et al. | 714/2 |
| 6,381,215 B1 | 4/2002 | Hamilton et al. | |
| 6,392,993 B1 | 5/2002 | Hamilton et al. | |
| 6,408,310 B1 * | 6/2002 | Hart | 707/201 |
| 6,425,014 B1 | 7/2002 | Aiken, Jr. et al. | |
| 6,427,148 B1 | 7/2002 | Cossock | |
| 6,446,219 B2 | 9/2002 | Slaughter et al. | |
| 6,449,641 B1 | 9/2002 | Moiin et al. | |
| 6,449,734 B1 | 9/2002 | Shrivastava et al. | |
| 6,453,426 B1 | 9/2002 | Gamache et al. | |
| 6,460,039 B1 | 10/2002 | Pinter et al. | |
| 6,496,481 B1 | 12/2002 | Wu et al. | |
| 6,507,863 B2 | 1/2003 | Novaes | |
| 6,529,958 B1 | 3/2003 | Oba et al. | |
| 6,545,981 B1 | 4/2003 | Garcia et al. | |
| 6,564,372 B1 | 5/2003 | Babaian et al. | |
| 6,574,668 B1 | 6/2003 | Gubbi et al. | |
| 6,578,032 B1 | 6/2003 | Chandrasekar et al. | |
| 6,611,923 B1 * | 8/2003 | Mutalik et al. | 714/4 |
| 6,625,118 B1 | 9/2003 | Hadi Salim et al. | |
| 6,625,639 B1 | 9/2003 | Miller et al. | |
| 6,718,361 B1 | 4/2004 | Basani et al. | |
| 6,757,698 B2 * | 6/2004 | McBride et al. | 707/204 |
| 6,823,512 B1 | 11/2004 | Miller et al. | |
| 6,839,752 B1 | 1/2005 | Miller et al. | |
| 6,847,984 B1 * | 1/2005 | Midgley et al. | 707/204 |
| 2002/0161889 A1 | 10/2002 | Gamache et al. | |
| 2002/0165977 A1 | 11/2002 | Novaes | |
| 2003/0041138 A1 | 2/2003 | Kampe et al. | |
| 2004/0153711 A1 | 8/2004 | Brunelle et al. | |

FOREIGN PATENT DOCUMENTS

| | | |
|---|---|---|
| JP | 07-311753 A | 11/1995 |
| JP | 2000-156706 A | 6/2000 |
| JP | 2000-196677 A | 7/2000 |

OTHER PUBLICATIONS

Jing-Chiou Liou et al., "A Comparison of General Approaches to Multiprocessor Scheduling," Parallel Processing Symposium, 1997, Proceedings, 11th International, Apr. 1-5, 1997, pp. 152-156.

Leszek Lilien, "Quasi-Partitioning: A New Paradigm for Transaction Execution in Partitioned Distributed Database Systems," Data Engineering, 1989, Proceedings, Fifth International Conference on Feb. 6-10, 1989, pp. 546-553.

Pei Yunzhang et al., "Totally Ordered Reliable Multicast for Whiteboard Application," Department of Computer Science and Technology, Tsinghua University, Beijing, 1999, pp. 1-7.

Wanlei Zhou et al., "Parallel Recovery in a Replicated Object Environment," School of Computing and Mathematics, Deakin University, pp. 1-6.

D. A. Agarwal et al., "A Reliable Ordered Delivery Protocol for Interconnected Local-Area Networks," in Proc. of the International Conference on Network Protocols, Tokyo, Japan, Nov. 1995, pp. 365-374.

Paul et al., "Reliable Multicast Transport (RMTP)," Apr. 1997, IEEE Journal on Selected Areas in Communications, vol. 15, No. 3, pp. 407-421.

"Distributed Parallel Build System for Hierarchically Organized Large Scale Software Systems", IBM Technical Disclosure Bulletin, US, vol. 39, No. 6, (Jun. 1, 1996), pp. 63-68.

* cited by examiner

SYNCHRONIZATION OF GROUP STATE DATA WHEN REJOINING A MEMBER TO A PRIMARY-BACKUP GROUP IN A CLUSTERED COMPUTER SYSTEM

FIELD OF THE INVENTION

The invention is generally related to clustered computer systems, and in particular, to the rejoining of members to groups in such systems.

BACKGROUND OF THE INVENTION

"Clustering" generally refers to a computer system organization where multiple computers, or nodes, are networked together to cooperatively perform computer tasks. An important aspect of a computer cluster is that all of the nodes in the cluster present a single system image—that is, from the perspective of a user, the nodes in a cluster appear collectively as a single computer, or entity.

Clustering is often used in relatively large multi-user computer systems where high performance and reliability are of concern. For example, clustering may be used to provide redundancy, or fault tolerance, so that, should any node in a cluster fail, the operations previously performed by that node will be handled by other nodes in the cluster. Clustering is also used to increase overall performance, since multiple nodes can often handle a larger number of tasks in parallel than a single computer otherwise could. Often, load balancing can also be used to ensure that tasks are distributed fairly among nodes to prevent individual nodes from becoming overloaded and therefore maximize overall system performance. One specific application of clustering, for example, is in providing multi-user access to a shared resource such as a database or a storage device, since multiple nodes can handle a comparatively large number of user access requests, and since the shared resource is typically still available to users even upon the failure of any given node in the cluster.

Clusters typically handle computer tasks through the performance of "jobs" or "processes" within individual nodes. In some instances, jobs being performed by different nodes cooperate with one another to handle a computer task. Such cooperative jobs are typically capable of communicating with one another, and are typically managed in a cluster using a logical entity known as a "group." A group is typically assigned some form of identifier, and each job in the group is tagged with that identifier to indicate its membership in the group.

A primary-backup group is a group in which one group member is designated as the primary, and the others members are backups. Primary-backup groups are often used when the primary member has connectivity with a resource, or "owns" a resource, such as a disk, tape or other storage unit, a printer or other imaging device, or another type of switchable hardware component or system. In a primary-backup group, only one primary member is defined, and there can never be two primary members at the same time.

Member jobs in a group typically communicate with one another using an ordered message-based scheme, where the specific ordering of messages sent between group members is maintained so that every member sees messages sent by other members in the same order as every other member, thus ensuring synchronization between nodes. Requests for operations to be performed by the members of a group are often referred to as "protocols," and it is typically through the use of one or more protocols that tasks are cooperatively performed by the members of a group.

Clusters often support changes in group membership through the use of group organizational operations such as membership change protocols, e.g., if a member job needs to be added to or removed from a group. In some clustered systems, a membership change protocol is implemented as a type of peer protocol, where all members receive a message and each member is required to locally determine how to process the protocol and return an acknowledgment indicating whether the message was successfully processed by that member. Typically, with a peer protocol, members are prohibited from proceeding on with other work until acknowledgments from all members have been received. In other systems, membership change protocols may be handled as master-slave protocols, where one of the members is elected as a leader, and controls the other members so as to ensure proper handling of the protocol.

In many clustering environments, members may from time to time leave a group, e.g., due to a failure, node maintenance, etc. Later, it may be desirable for these members to rejoin the group. Such a member is referred to as a "rejoining member." In this situation, information about the group, as well as the rejoining member's perception of the group, has a direct bearing on the terms under which a member rejoins the group. This information is referred to as "group state data." Group state data is typically distributed, or replicated, among all group members.

In some environments, all of the group state data is replicated on each member of a group. In other environments, some of the group state data may be stored globally, e.g., in a global file system accessible to all members. However, even in the latter environments, some portion of the relevant group state data is typically replicated on each member of a group.

In the case of a primary-backup group, the distributed group state data held by members may include information that indicates which member is the primary member, the order of backup, e.g., first backup, second backup, etc., and the resources that a primary member needs in order to be active, e.g., necessary files, IP addresses, disks units, etc.

A problem that exists when a member leaves and then rejoins a group, is that of synchronizing the group state data between the joining member and the other, existing members, as the group state data held by a member that left the group may not be the same as the group state data held by other members of the group when the member rejoins. For example, the replicated group state data may have changed while the rejoining member was not a member of the group, or conversely, the replicated group state data held by existing members of the group may be outdated and the rejoining member may have the most current group state data. An example of the latter instance is when the primary member is rejoining, as only the primary member may have data regarding the current condition of group related resources.

One conventional method by which this problem is addressed in existing clustering implementations is to view the replicated group state held by existing members, or the "existing group state data," as a protocol. When this is done, a rejoining member typically sends its view of the replicated group state data to all existing members. The group then attempts to reach a consensus as to which group state data, or perhaps, which parts of various group state data, will then be replicated among all members.

One trouble with the aforementioned conventional method is reconciling inconsistencies in various group state data when a member rejoins. Oftentimes, the existing group state data or the rejoining member's group state data is used as a first guess at the appropriate group state. As a second guess, some combination of the existing group state data and the rejoining member's group state data may be used as the appropriate group state. Beyond this, and as is often the case, manual intervention is required.

Manual invention requires an administrator to reform the group with new group state data using commands to adjust the data of existing members and the rejoining member. Typically, the administrator selects a group member and uses the selected member as a "master" that all other members are synchronized to. Manual invention suffers from, among other things, the introduction of errors and delays.

Therefore, a significant need exists in the art for an improved manner of synchronizing group state data in connection with rejoining a member to a primary-backup group in a clustered computer system.

SUMMARY OF THE INVENTION

The invention addresses these and other problems associated with the prior art by providing an apparatus, program product, and method of rejoining a member to a primary-backup group in a clustered computer system, in which the determination of which group state data is to be used subsequent to a member rejoin is based predominately on whether that member is the likely primary member of the group. In particular, during rejoining of a member to a primary-backup group, a determination is made as to whether the rejoining member is the primary member for the primary-backup group. Based upon such a determination, a selection is then made between member and group overwrite operations to synchronize the group state data among the members of the group. In a member overwrite operation the copy of the replicated group state data held by the rejoining member is overwritten with data from a copy of the replicated group state data held by an existing member in the primary-backup group. In a group overwrite operation the copy of the replicated group state data held by existing members in the primary-backup group is overwritten with data from the copy of the replicated group state data held by the rejoining member.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
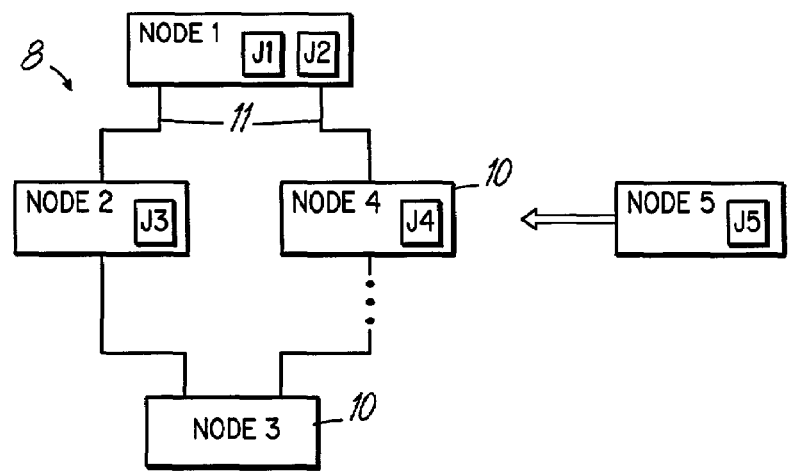
FIG. 1 is a block diagram of a clustered computer system consistent with the invention, illustrating a rejoin operation performed for a group member that has previously left a group.

Turning now to the Drawings, wherein like numbers denote like parts throughout several views, FIG. 1 illustrates an exemplary clustered computer system 8 including a plurality of nodes 10 interconnected with one another via a network of interconnections 11. Any number of network topologies commonly utilized in clustered computer systems may be used consistent with the invention. Moreover, individual nodes 10 may be physically located in close proximity with other nodes, or may be geographically separated from other nodes, e.g., over a wide area network (WAN), as is well known in the art.

In the context of a clustered computer system, at least some computer tasks are performed cooperatively by multiple nodes executing cooperative computer processes (referred to herein as "jobs") that are capable of communicating with one another using cluster infrastructure software. Such cooperative jobs are logically organized into a "group," with each cooperative job being designated as a "member" of the group. Group members, however, need not necessarily operate on a common task-typically all that is required for members of a group is that such members be capable of communicating with one another during execution.

As stated, FIG. 1 illustrates an exemplary cluster of nodes 10, also denoted herein for purposes of example by the sequential identifiers 1, 2, 3 . . . 5. Resident within various nodes are a plurality of jobs J1–J5 forming the members of an exemplary primary-backup group in the clustered computer system. As shown in FIG. 1, nodes in a clustered computer system are not required to participate in all groups (e.g., node 3). Also, multiple jobs from a given group may also be resident in the same node (e.g., jobs J1 and J2 in node 1).

As an example of the herein-described group state data synchronization functionality, FIG. 1 illustrates a job J5 resident on node 5 and awaiting rejoining with the primary-backup group. In this context, Member J5 is referred to as the "rejoining member", while Members J1–4 are referred to as "existing group members."

In the illustrated embodiments, member jobs communicate with one another through the use of ordered messages. A portion of such messages are referred to herein as "requests," which are used to initiate "protocols" in response to activation by a user (e.g., an application or other computer process executing on one or more nodes in the clustered computer system). A protocol is a unit of work that all members of a group are required to handle. Typically, in response to a protocol request, each member is also required to return an acknowledgment message to indicate success or failure of a particular protocol by that member. Moreover, typically no member is permitted to continue until acknowledgment messages have been received from all group members, and if a member failure occurs, the failure is translated into an acknowledgment message to prevent the protocol from hanging.

Membership in a group need not be static, and many clustered computer systems support the ability to add/join or remove members to or from a group. Typically, a change in membership of a group is handled via a particular protocol referred to as a membership change protocol, and is handled through the use of a membership change request message forwarded to all members of a group.

Consistent with the present invention, the group illustrated in FIG. 1 represents a primary-backup group. This exemplary primary-backup group has one primary member.

There can never be two primary members at the same time. Group state data is distributed or "replicated" and held by all group members. Group state data held by each member in the exemplary primary-backup group may be data that indicates whether that member is the primary member, the order of backup, e.g., first backup, second backup, etc., and the resources that a primary member needs in order to be active, e.g., necessary files, IP addresses, disks units, etc.

While the copy of the replicated group state data on each member of a group is typically identical in many environments, it will be appreciated that whenever a member leaves a group and later attempts to rejoin the group, the copy of the replicated group state data for the rejoining member may differ from the copies of the replicated group state data on the existing members of the group. Synchronization of such differing copies as described herein typically results in identical copies of the group state data being stored in all group members upon completion of a rejoin operation.

More particularly with regard to the rejoining of a member J5 resident on node 5, the synchronization of group state data must be considered. A set of rules, discussed in greater detail below, is used to determine whether a member overwrite operation or a group overwrite operation is selected. In a member overwrite operation, the copy of the replicated group state data for the rejoining member is overwritten with data from the copy of the replicated group state data for an existing member in the primary-backup group. In a group overwrite operation, the copies of the replicated group state data for the existing members in the primary-backup group are overwritten with data from the copy of the replicated group state data for the rejoining member.

It will be appreciated that group state data held by various members may be organized in various manners. As such, overwriting, as mention herein, may comprise overwriting some or all of such group state data in some or all of the group members and should not be read to include any limitation on the manner in which this data is overwritten.

It will be further appreciated that nomenclature other than that specifically used herein to describe the handling of computer tasks by a clustered computer system using cluster infrastructure software may be used in other environments. Therefore, the invention should not be limited to the particular nomenclature used herein, e.g., as to protocols, requests, members, groups, messages, jobs, etc.

Figure 2:
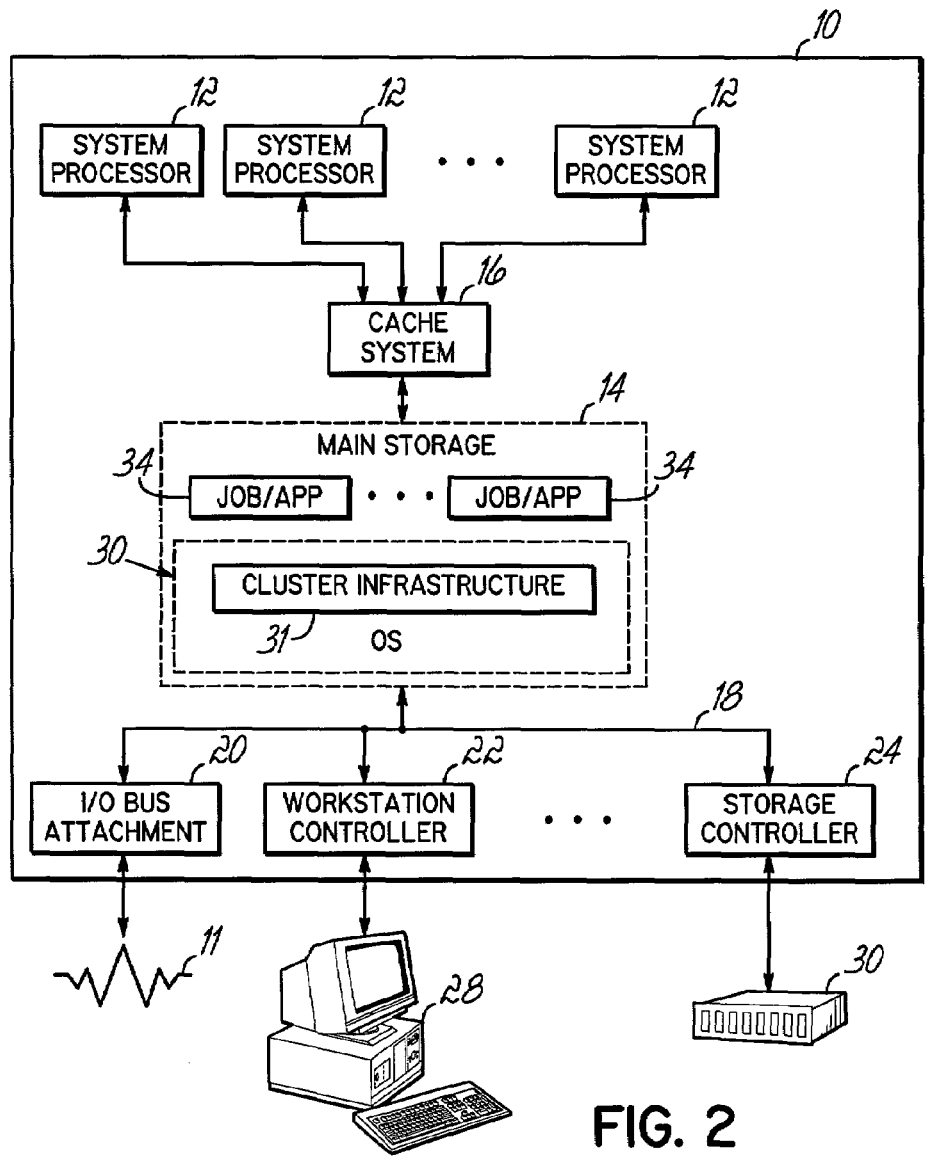
FIG. 2 is a block diagram of a node in the clustered computer system of FIG. 1.

Now turning to FIG. 2, an exemplary hardware configuration for one of the nodes 10 in clustered computer system 8 is shown. Node 10 generically represents, for example, any of a number of multi-user computers such as a network server, a midrange computer, a mainframe computer, etc. However, it should be appreciated that the invention may be implemented in other computers and data processing systems, e.g., in stand-alone or single-user computers such as workstations, desktop computers, portable computers, and the like, or in other programmable electronic devices (e.g., incorporating embedded controllers and the like).

Node 10 generally includes one or more system processors 12 coupled to a main storage 14 through one or more levels of cache memory disposed within a cache system 16. Furthermore, main storage 14 is coupled to a number of types of external devices via a system input/output (I/O) bus 18 and a plurality of interface devices, e.g., an input/output adaptor 20, a workstation controller 22 and a storage controller 24, which respectively provide external access to one or more external networks (e.g., a cluster network interconnection 11), one or more workstations 28, and/or one or more storage devices such as a direct access storage device (DASD) 30. Any number of alternate computer architectures may be used in the alternative.

To implement an apparatus, program product and method for rejoining a member to a primary-backup group in a clustered computer system consistent with the invention, message processing functionality may be implemented within cluster infrastructure software implemented in each node. For example, node 10 is illustrated as having resident in main storage 14 an operating system 30 implementing cluster infrastructure software 31. In one exemplary embodiment, each node 10 is implemented as an AS/400 or iSeries eServer from International Business Machines Corporation, and Operating System 30 is implemented as an OS/400-compatible operating system incorporating clustering capabilities. The general use and configuration of clustering services in the exemplary environment is well known to one of ordinary skills in the art.

One or more jobs or applications 34 are also illustrated in node 10, each having access to features implemented within the cluster infrastructure software 31. It will be appreciated, however, that the functionality or features described herein may be implemented in other layers of software in node 10, and that the functionality may be allocated among other programs, computers or components in clustered computer system 8. Therefore, the invention is not limited to the specific software implementation described herein.

The discussion hereinafter will focus on the specific routines utilized to rejoin a member to a primary-backup group in a clustered computer system. The routines executed to implement the embodiments of the invention, whether implemented as part of an operating system or a specific application, component, program, object, module or sequence of instructions, will also be referred to herein as "computer programs," or simply "programs." The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and nonvolatile memory devices, floppy and other removable disks, hard disk drives, optical disks (e.g., CD-ROM's, DVD's, etc.), among others, and transmission type media such as digital and analog communication links.

It will be appreciated that various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Overview of Exemplary Rules for Overwriting Group State Data

As a general rule, the group state data held by existing group members will supercede a rejoining member's group state data unless the rejoining member is determined to be the primary member of such a group. As follows, four basic rules encompass and modify this basic rule to include certain circumstances.

1. If the rejoining member is not the primary member, then the group state data held by the existing members of the primary-backup group is used to synchronize the group state data.

2. If the rejoining member is determined to be the primary member and the group state data held by the existing members of the primary-backup group indicates that the rejoining member is the primary member, then the group state data from the rejoining member is used to synchronize the group state data.

3. If the group state data held by the rejoining member indicates that the rejoining member is the primary member, but the group state data held by the existing group members does not indicate the rejoining member is the primary member, then the group state data held by the existing group members is used to synchronize the group state data. However, in some embodiments, this circumstance is modified for those instances in which the primary member physically owns a resource that cannot be shared. In this circumstance, the member that owns a resource that can not be shared becomes the primary member, and the group state data held by that member is used to synchronize the group state data.

4. If the rejoining member has valid group state, whether it is determined to be a primary member or not, and the existing members of the primary-backup group do not have a valid group state, then the group state data held by the rejoining member is used to synchronize the group state data.

In addition, certain restrictions may be placed on changes in the group state data if the primary member is not in the primary-backup group. These restrictions may be required due to potential changes to resources that a primary member owns or needs. This prevents a primary member from holding different resources than what the group state data held by existing members of the group indicates. This also ensures that rule 2 listed above may be implemented. In addition, these restrictions allow an administrator to restore a primary-backup group that has partially or fully corrupted group state data. This allows a member to have its group state data restored locally, and then, as other members rejoin with this member, the locally restored group state data may eventually be distributed to all group members.

The above rules cover all possible cases and may be summarized as follows, the parentheses indicating the rule that applies:

Rejoining member not the primary member, group has valid state (1)
Rejoining member not the primary member, group does not have valid state (4)
Rejoining member is the primary member, group does not have valid state (4)
Rejoining member is the primary member, group has valid state that conflicts with the rejoining member (3)
Rejoining member is the primary member, group has valid state that does not conflict with the primary member (2)
Rejoining member has invalid state, group has valid or invalid state (1)

A determination of whether a rejoining member is the primary member is typically based upon whether the copy of one group state data for that rejoining member indicates that the member is the primary. In other embodiments, however, other sources of such information, whether located elsewhere in the same or other nodes in the clustered computer system, may also be used to make this determination.

Figure 3:
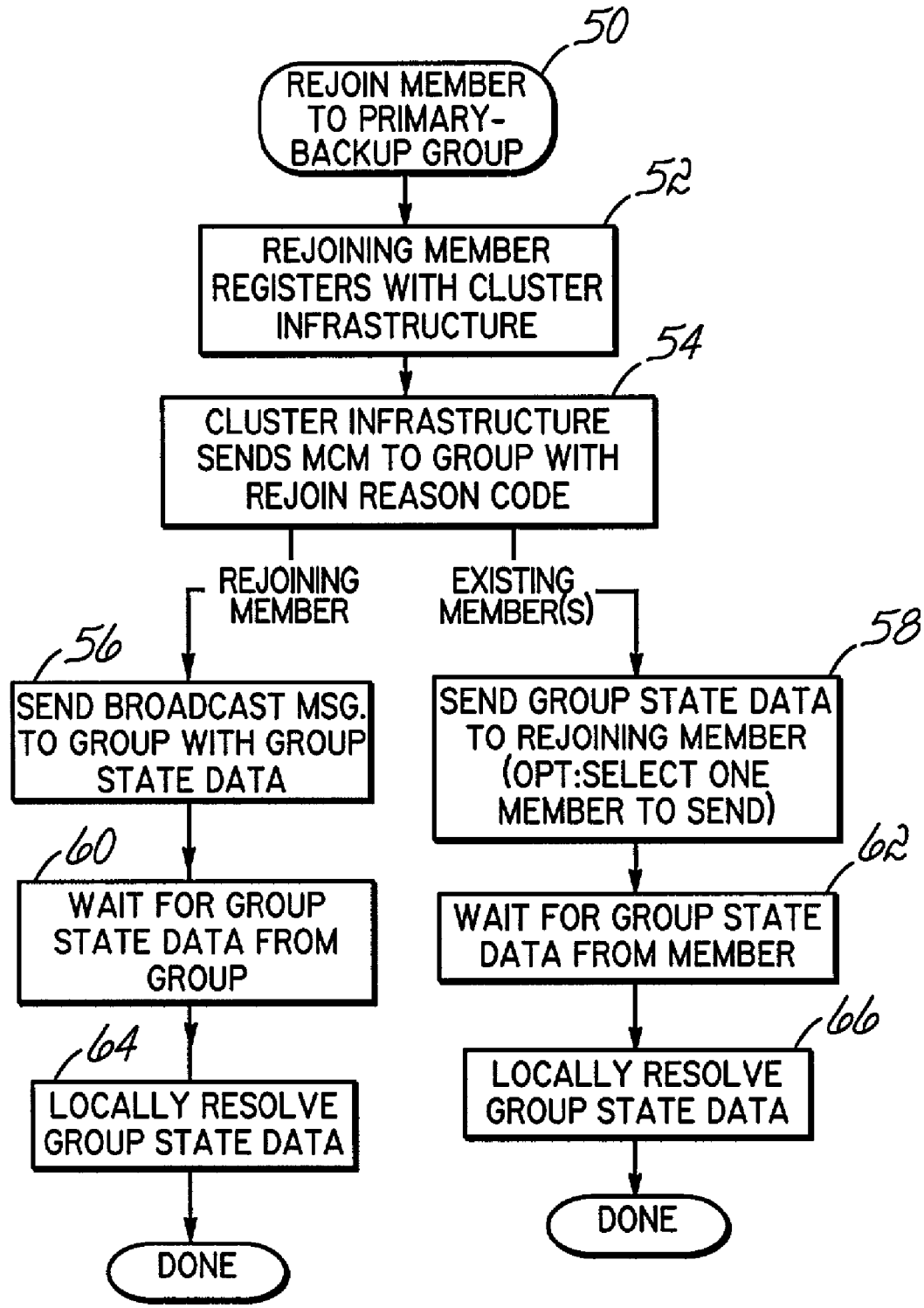
FIG. 3 is a flow chart illustrating an exemplary routine for rejoining a member to primary-backup group in the clustered computer system of FIG. 1.

As a further illustration of an exemplary implementation of the invention, FIG. 3 shows an exemplary routine 50 for rejoining a member to a primary-backup group. Routine 50 begins in block 52 wherein the rejoining member registers with the cluster infrastructure software on the same node as the rejoining member to request to rejoin the group. It will be appreciated that any member of the group is capable of leaving and rejoining the group. However, node 5, as shown in FIG. 1, is used for ease of explanation.

Block 54 then distributes a message to all nodes in the group that a request to rejoin the group has been received. In the illustrated embodiment, this occurs by way of a membership change message (MCM) using a reason code of "rejoin." Ordered messaging in the illustrated embodiment ensures that all members receive the MCM in the same order. The rejoin reason code provides the impetus for the member to rejoin the primary-backup group. However, it will be appreciated that similar messages in other messaging schemes used in other embodiments could be used to provide similar functionality to constitute a member rejoin operation.

For the rejoining member, block 56 shows that a broadcast message is sent to all existing members of the group with the rejoining member's copy of the group state data. Similarly, the copy of the distributed group state data held by an existing member of the group is sent to the rejoining member, as shown in block 58, typically via a point-to-point message sent directly to the rejoining member. As noted in block 58, the group may select one member to send the message to the rejoining member, e.g,. based upon any of a number of different selection algorithms such as based upon which existing member is the lowest-named member.

Once the respective group state data has been sent, both the rejoining member and the existing members wait to receive the appropriate group state data from one another, as shown in blocks 60 and 62, respectively. In blocks 64 and 66, the rejoining member and the existing members of the group each locally resolve the group state data by calling a locally resolve group state data routine in the respective local nodes to achieve a global solution that facilitates the rejoining member rejoining the group. Upon completion of the local resolution of group state data, the primary member for the group has been agreed upon, and is known to all members. The primary member can thus proceed with the various operations that are necessary to prepare the resources for use, e.g., turn on devices, open connections, etc.

Figure 4:
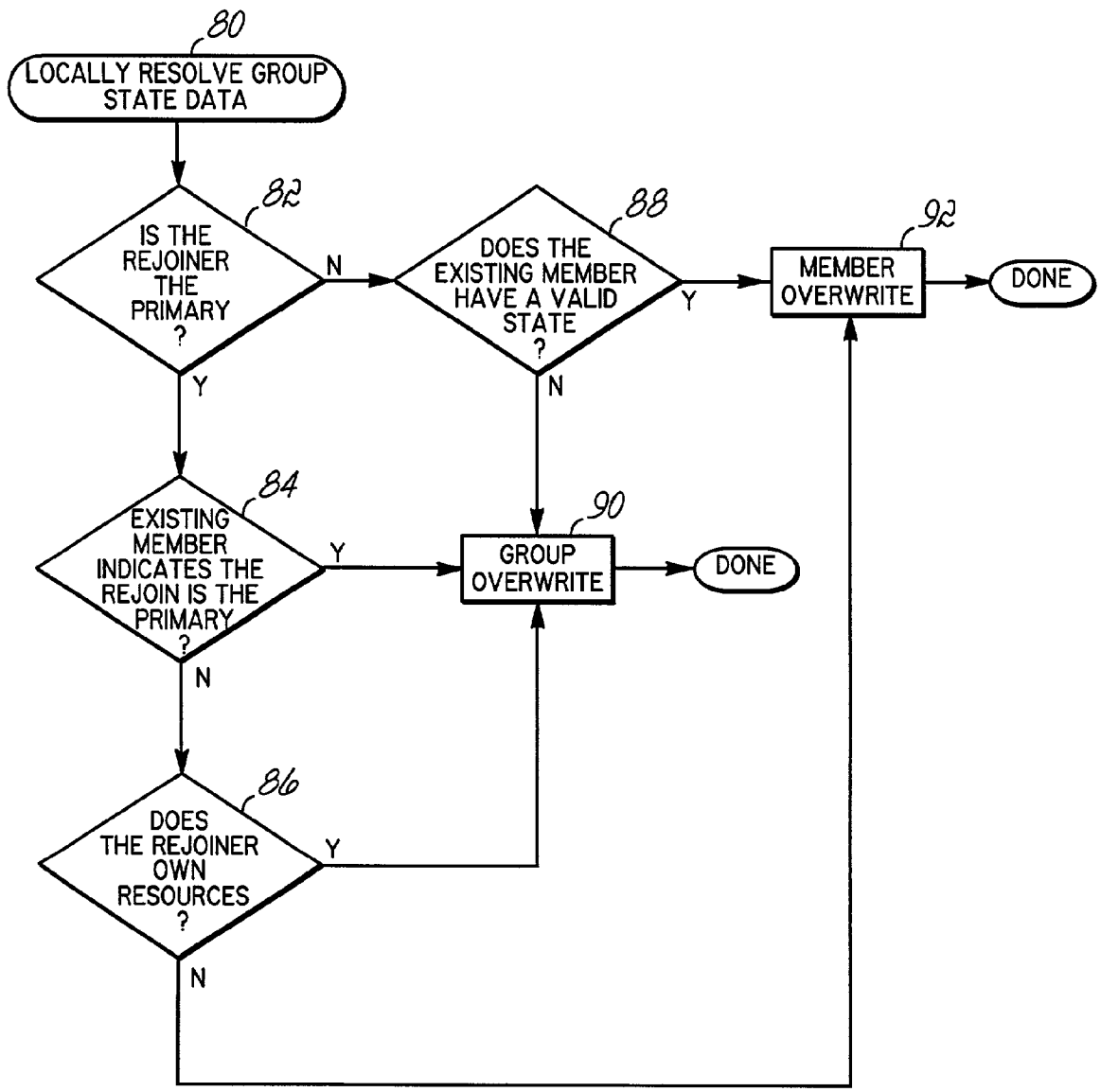
FIG. 4 is a flow chart illustrating the locally resolve group state data routine referenced in FIG. 3.

FIG. 4 illustrates an exemplary routine 80 for locally resolving the group state data. Routine 80 is executed by the rejoining member, as well as each existing member of the primary-backup group. Routine 80 begins in block 82 by determining whether the copy of the group state data held by the rejoining member indicates that the rejoining member is the primary member. If the group state data held by the rejoining member does indicate that the rejoining member is the primary member, routine 80 proceeds to block 84; otherwise, the routine 80 proceeds to block 88.

Block 84 determines whether the distributed group state data held by an existing member indicates that the rejoining member is the primary member. If the distributed group state data held that existing member indicates that the rejoining member is the primary member, existing members' group state data is overwritten with data from the copy of the group state data held by the rejoining member in block 90. This is the group overwrite operation previously discussed. If the distributed group state data held by that existing member indicates that the rejoining member is not the primary member, the routine 80 proceeds to block 86.

Block 86 determines whether the distributed group state data held by the rejoining member indicates ownership of resources. Ownership in this context refers to a member's connectivity with a resource, such as switchable hardware. If the distributed group state data held by the rejoining member does indicate ownership of resources, the group overwrite operation in block 90 is used. Otherwise, the program proceeds to block 92 wherein the group state data held by the rejoining member is overwritten with the distributed group state data held by an existing member. This is the member overwrite operation previously discussed.

Returning to block 88, wherein a determination has been made that the group state data held by the rejoining member indicates that the rejoining member is not the primary member. Block 88 determines whether the distributed group state data held by an existing group member indicates a valid group state. For example, an invalid group state may occur when the resource list for the group is lost or corrupted, the list of eligible members for the group is corrupted, or an invalid resource is listed, e.g., an address that does not exist. If so, the member overwrite operation in block 92 is used. If not, the group overwrite operation in block 90 is used.

Upon the completion of routine 80 by each member of the primary-backup group, the rejoining member and the existing members of the primary-backup group will have locally resolved the group state data so the rejoining member can once again be joined as a member of the group. Completion of the rejoin operation, and acquisition of the resources by the primary member, can then proceed thereafter.

The present invention benefits from requiring minimal user intervention in reformation of primary-backup groups. In addition, due to the relatively few number of rules, the present invention is easy to implement and is predictable. Concern for overhead in the overwrite operations discussed above is largely unfounded, as group state data tends to be relatively small in size, on the order of a few kilobytes, so there is little overhead involved in the overwrite operations as a practical matter. Sending the entire group state is also much easier from a programming viewpoint.

Those skilled in the art will recognize that the exemplary environments illustrated in FIGS. 1, 2, 3 and 4 are not intended to limit the present invention. Indeed, those skilled in the art will recognize that other alternative hardware and/or software environments may be used without departing from the scope of the invention. Therefore, the invention lies in the claims hereinafter appended.

What is claimed is:

1. A method for rejoining a member to a primary-backup group in a clustered computer system, wherein the primary-backup group is of the type including a primary and at least one backup member, each of which including a copy of replicated group state data for the primary-backup group, the method comprising:
    (a) determining whether the rejoining member is the primary member for the primary-backup group; and,
    (b) selecting between member and group overwrite operations based upon such determination, wherein the member overwrite operation includes overwriting the copy of the replicated group state data for the rejoining member with data from the copy of the replicated group state data for an existing member in the primary-backup group, and wherein the group overwrite operation includes overwriting the copy of the replicated group state data for the existing member in the primary-backup group with data from the copy of the replicated group state data for the rejoining member.

2. The method of claim 1, wherein determining whether the rejoining member is the primary member for the primary-backup group comprises determining whether the copy of replicated group state data for the primary-backup group held by the rejoining member indicates that the rejoining member is the primary member.

3. The method of claim 1, further comprising determining whether the copy of the replicated group state data for the existing member in the primary-backup group is valid, wherein selecting between the member and group overwrite operations comprises selecting the group overwrite operation if the copy of the group state data for the existing member is not valid.

4. The method of claim 1, further comprising determining whether the copy of the replicated group state data for the existing member in the primary-backup group is valid, wherein selecting between the member and group overwrite operations comprises selecting the member overwrite operation if the copy of the group state data for the existing member is valid.

5. The method of claim 1, further comprising determining whether the copy of the replicated group state data for the existing member in the primary-backup group indicates that the rejoining member is the primary member, wherein selecting between the member and group overwrite operations comprises selecting the group overwrite operation if the copy of the group state data for the existing member indicates that the rejoining member is the primary member.

6. The method of claim 1, further comprising determining whether the copy of the replicated group state data for the existing member in the primary-backup group indicates that the rejoining member is the primary member, wherein selecting between the member and group overwrite operations comprises selecting the member overwrite operation if the copy of the group state data for the existing member indicates that the rejoining member is not the primary member.

7. The method of claim 1, further comprising determining whether the copy of the replicated group state data for the rejoining member indicates that the rejoining member owns a resource, wherein selecting between the member and group overwrite operations comprising selecting the group overwrite operation if the copy of the group state data for the rejoining member indicates that the rejoining member owns a resource.

8. The method of claim 1, further comprising determining whether the copy of the replicated group state data for the rejoining member indicates that the rejoining member owns a resource, wherein selecting between the member and group overwrite operations comprising selecting the member overwrite operation if the copy of the group state data for the rejoining member indicates that the rejoining member does not own a resource.

9. The method of claim 1, further comprising registering the rejoining member with a cluster infrastructure.

10. The method of claim 1, further comprising sending a membership change message to the existing member of the primary-backup group.

11. The method of claim 1, further comprising sending data from the registering member's copy of the group state data to the existing member in the primary-backup group.

12. The method of claim 1, further comprising sending data from the existing member's copy of the group state data to the rejoining member.

13. An apparatus, comprising:
(a) a memory; and,
(b) a program resident in the memory, the program configured to rejoin a member to a primary-backup group in a clustered computer system, wherein the primary-backup group is of the type including a primary and at least one backup member, each of which including a copy of replicated group state data for the primary-backup group, wherein the program is configured to determine whether the rejoining member is the primary member for the primary-backup group; and, to select between member and group overwrite operations based upon such determination, wherein the member overwrite operation includes overwriting the copy of the replicated group state data for the rejoining member with data from the copy of the replicated group state data for an existing member in the primary-backup group, and wherein the group overwrite operation includes overwriting the copy of the replicated group state data for the existing member in the primary-backup group with data from the copy of the replicated group state data for the rejoining member.

14. The apparatus of claim 13, wherein the program is further configured to determine whether the copy of the replicated group state data for the existing member in the primary-backup group is valid; and, to select between the member and group overwrite operations by selecting the group overwrite operation if the copy of the group state data for the existing member is not valid.

15. The apparatus claim 13, wherein the program is further configured to determine whether the copy of the replicated group state data for the existing member in the primary-backup group indicates that the rejoining member is the primary member; and, to select between the member and group overwrite operations by selecting the group overwrite operation if the copy of the group state data for the existing member indicates that the rejoining member is the primary member.

16. The apparatus of claim 13, wherein the program is further configured to determine whether the copy of the replicated group state data for the rejoining member indicates that the rejoining member owns a resource; and, to select between the member and group overwrite operations by selecting the group overwrite operation if the copy of the group state data for the rejoining member indicates that the rejoining member owns a resource.

17. A program product, comprising:
(a) a program configured to rejoin a member to a primary-backup group in a clustered computer system, wherein the primary-backup group is of the type including a primary and at least one backup member, each of which including a copy of replicated group state data for the primary-backup group, wherein the program is configured to determine whether the rejoining member is the primary member for the primary-backup group; and, to select between member and group overwrite operations based upon such determination, wherein the member overwrite operation includes overwriting the copy of the replicated group state data for the rejoining member with data from the copy of the replicated group state data for an existing member in the primary-backup group, and wherein the group overwrite operation includes overwriting the copy of the replicated group state data for the existing member in the primary-backup group with data from the copy of the replicated group state data for the rejoining member; and,
(b) a physical recordable computer readable medium bearing the program.

18. The program product of claim 17, wherein the program is further configured to determine whether the copy of the replicated group state data for the existing member in the primary-backup group is valid; and, to select between the member and group overwrite operations by selecting the group overwrite operation if the copy of the group state data for the existing member is not valid.

19. The program product of claim 17, wherein the program is further configured to determine whether the copy of the replicated group state data for the existing member in the primary-backup group indicates that the rejoining member is the primary member; and, to select between the member and group overwrite operations by selecting the group overwrite operation if the copy of the group state data for the existing member indicates that the rejoining member is the primary member.

20. The program product of claim 17, wherein the program is further configured to determine whether the copy of the replicated group state data for the rejoining member indicates that the rejoining member owns a resource; and, to select between the member and group overwrite operations by selecting the group overwrite operation if the copy of the group state data for the rejoining member indicates that the rejoining member owns a resource.

21. A clustered computer system, comprising:
(a) a plurality of nodes coupled to one another over a network;
(b) a plurality of member jobs defining a primary-backup group in the clustered computer system, and wherein the primary-backup group is of the type including a primary and at least one backup member, each of which includes a copy of replicated group state data for the primary-backup group, configured to be executed by at least one of the plurality of nodes; and,
(c) a program configured to be executed on at least one of the plurality of nodes to rejoin a member to the primary-backup group, wherein the program is configured to determine whether the rejoining member is the primary member for the primary-backup group; and, to select between member and group overwrite operations based upon such determination, wherein the member overwrite operation includes overwriting the copy of the replicated group state data for the rejoining member with data from the copy of the replicated group state data for an existing member in the primary-backup group, and wherein the group overwrite operation includes overwriting the copy of the replicated group state data for the existing member in the primary-backup group with data from the copy of the replicated group state data for the rejoining member.

22. The cluster computer system of claim 21, wherein the program is further configured to determine whether the copy of the replicated group state data for the existing member in the primary-backup group is valid; and, to select between the member and group overwrite operations by selecting the group overwrite operation if the copy of the group state data for the existing member is not valid.

23. The clustered computer system of claim 21, wherein the program is further configured to determine whether the copy of the replicated group state data for the existing member in the primary-backup group indicates that the rejoining member is the primary member; and, to select between the member and group overwrite operations by selecting the group overwrite operation if the copy of the group state data for the existing member indicates that the rejoining member is the primary member.

24. The clustered computer system of claim 21, wherein the program is further configured to determine whether the copy of the replicated group state data for the rejoining member indicates that the rejoining member owns a resource; and, to select between the member and group overwrite operations by selecting the group overwrite operation if the copy of the group state data for the rejoining member indicates that the rejoining member owns a resource.

25. A method for rejoining a member to a primary-backup group in a clustered computer system, wherein the primary-backup group is of the type including a primary and at least one backup member, each of which including a copy of replicated group state data for the primary-backup group, the method comprising:

(A) overwriting the copy of the replicated group state data for an existing member in the primary-backup group with data from the copy of the replicated group state data for the rejoining member in response to at least one of:

(i) determining that the copy of the replicated group state data for the rejoining member indicates that the rejoining member is the primary member for the primary-backup group and that the copy of the replicated group state data for an existing member indicates that the rejoining member is the primary member for the primary-backup group;

(ii) determining that the copy of the replicated group state data for the rejoining member indicates that the rejoining member is the primary member for the primary-backup group, that the copy of the replicated group state data for an existing member indicates that the rejoining member is not the primary member for the primary-backup group, and that the rejoining owner owns a resource; and (iii) determining that the copy of the replicated group state data for the rejoining member indicates that the rejoining member is not the primary member for the primary-backup group and that an existing member does not have a valid state; and (B) overwriting the copy of the replicated group state data for the rejoining member in the primary-backup group with data from the copy of the replicated group state data for an existing member in response to at least one of:

(i) determining that the copy of the replicated group state data for the rejoining member indicates that the rejoining member is the primary member for the primary-backup group, that the copy of the replicated group state data for an existing member indicates that the rejoining member is not the primary member for the primary-backup group, and that the rejoining owner does not own a resource; and (ii) determining that the copy of the replicated group state data for the rejoining member indicates that the rejoining member is not the primary member for the primary-backup group and that an existing member has a valid state.

* * * * *